United States Patent [19]
Zhang et al.

[11] Patent Number: 5,325,097
[45] Date of Patent: Jun. 28, 1994

[54] MULTIMODE RADAR FOR ROAD VEHICLE BLIND-ZONE TARGET DISCRIMINATION

[75] Inventors: Zhaohong Zhang, Kokomo; Michael J. Shorkey, Noblesville; Fie A. Liem, Kokomo, all of Ind.

[73] Assignee: Delco Electronics Corporation, Kokomo, Ind.

[21] Appl. No.: 69,470

[22] Filed: Jun. 1, 1993

[51] Int. Cl.$^5$ .............................................. G01S 13/08
[52] U.S. Cl. ........................................ 342/71; 342/130
[58] Field of Search .................... 342/70, 71, 72, 83, 342/128, 129, 130

[56] References Cited
U.S. PATENT DOCUMENTS

| | | | |
|---|---|---|---|
| 3,611,370 | 10/1971 | Frasure | 342/128 |
| 4,011,563 | 3/1977 | Robbi | 343/7 VM |
| 4,348,675 | 9/1982 | Senzaki et al. | 343/7 VM |
| 5,087,918 | 2/1992 | May et al. | 342/70 X |

OTHER PUBLICATIONS

William C. Troll, Automotive Radar Brake, 1974, p. 478, SAE-740095.

*Primary Examiner*—Mark Hellner
*Attorney, Agent, or Firm*—Vincent A. Cichosz; Mark A. Navarre

[57] ABSTRACT

A road vehicle radar system for discriminating between hazard and non-hazard targets within a predetermined zone uses a pair of frequency modulated continuous wave radar cycles (FM-CW) and a single continuous wave cycle (CW) in the generation of radar quantities for measuring target range and apparent target velocity. Measured quantities from the FM-CW and CW cycles are compared with predetermined quantities for discriminating between hazard and non-hazard targets.

4 Claims, 3 Drawing Sheets ical radar system presents
many challenges to the system designer, among the
most troublesome being differentiation between hazard
and non-hazard targets, both of which return transmitted radar signals. Typical non-hazard targets include
road signs, bridges, fences, guard rails and road-side
burms, etc. Poor discrimination of such non-hazards
from hazards of course limits the effectiveness and reliability of automotive radar systems.

MULTIMODE RADAR FOR ROAD VEHICLE BLIND-ZONE TARGET DISCRIMINATION

BACKGROUND OF THE INVENTION

This invention is related to radar systems for automotive hazard detection. More particularly, this invention relates to improvements in discrimination of bona fide hazard targets from various non-hazard targets and/or clutter commonly encountered in the typical automotive operating environment.

Many attempts at providing reliable hazard target discrimination have been carried out in the field of vehicular radar systems which provide target range and relative velocity measurements thereof. The operating environment of an automotive radar system presents many challenges to the system designer, among the most troublesome being differentiation between hazard and non-hazard targets, both of which return transmitted radar signals. Typical non-hazard targets include road signs, bridges, fences, guard rails and road-side burms, etc. Poor discrimination of such non-hazards from hazards of course limits the effectiveness and reliability of automotive radar systems.

Various attempts in the art have been made to remedy these radar system shortfalls. One such example of these attempts includes limiting the range and pattern width of signal transmission and reception which in turn also undesirably limits the area of detection. This is an especially unattractive option where, as in a vehicle blind-zone detection radar system, a relatively wide area needs to be covered. Other proposals for solving these radar system shortfalls includes multiple transmitter and/or receiver configurations which of course add complexity and cost. Variable transmitted radar pattern angle and range, interactive in response to steering input, have also been proposed to limit return signals from non-hazard targets such as those which are tangential to a vehicle's travel around a curve or bend. This technique may be useful for look-ahead or look-back radar systems where radar pattern is substantially aligned with the major axis of the vehicle but does not address the problems of blind-zone radar systems where the transmission pattern is intentionally at an angle from the major axis of the vehicle. Additionally, relatively complicated return signal processing to separate multipath signals in frequency bands have been proposed to discriminate between multiple targets.

SUMMARY OF THE INVENTION

The present invention is concerned therefore with providing accurate discrimination of hazard targets from non-hazard targets. One object of the present invention is to accomplish such discrimination without proliferating hardware or its complexity. Additionally a further object is to accomplish target discrimination without limiting the area covered by the radar system. A further object is to accomplish such discrimination with relatively simple processing of target data.

According to the present invention, a multimode radar system provides for accurate target discrimination in an automotive application. A FM-CW portion of transmission and reception is utilized in the determination of a target's apparent velocity and range. A CW portion of transmission and reception is utilized in the determination of the target's apparent velocity. The relationship as between the range and two apparent velocities of the target determine whether the target is a hazard or a non-hazard target.

DETAILED DESCRIPTION OF A PREFERRED EMBODIMENT

Figure 1:
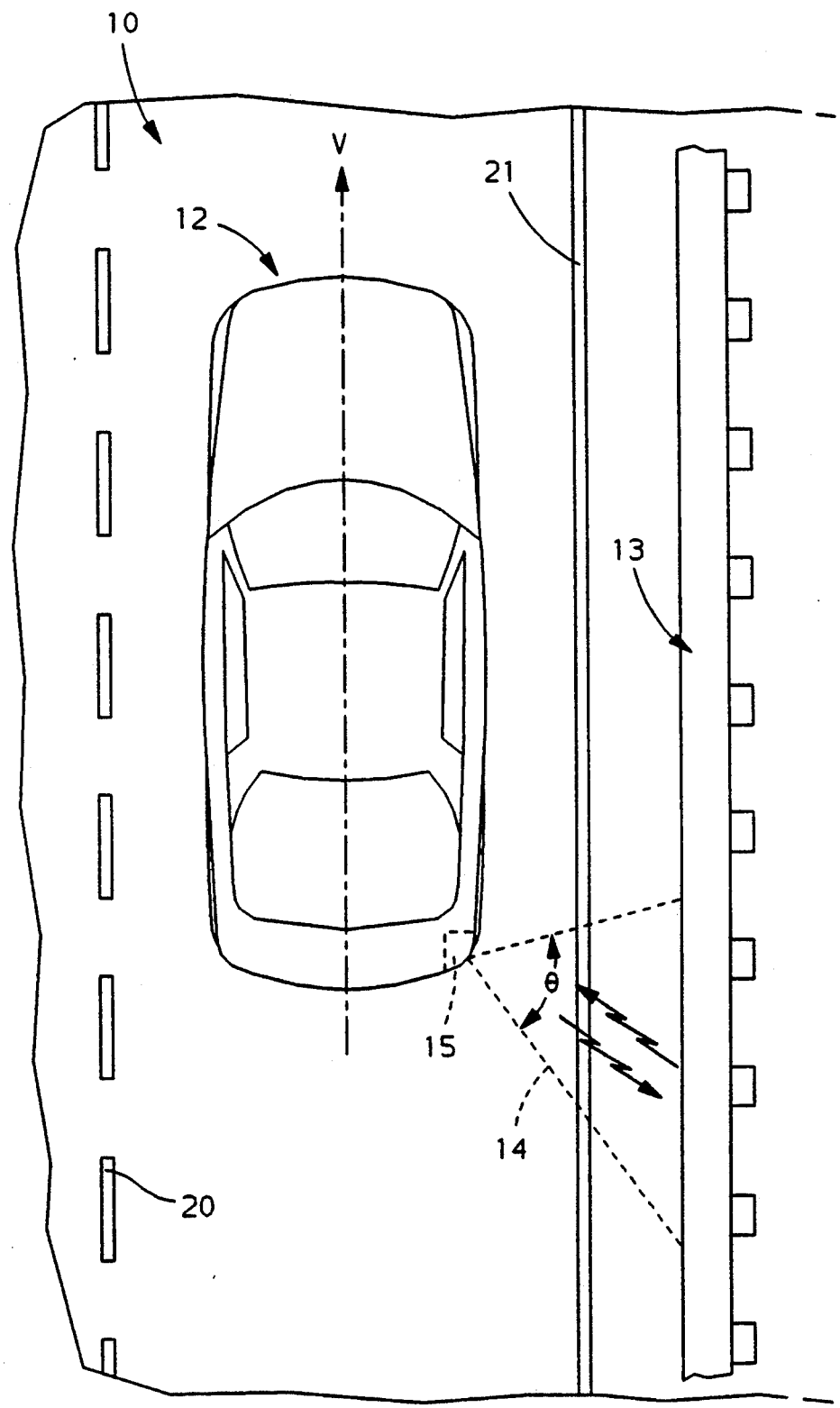
FIG. 1 is a diagram illustrating an exemplary vehicular blind-zone radar pattern in relation to a carrying vehicle and typical non-hazard target according to the present invention.

FIG. 1 shows a motor vehicle 12 traveling in a forward direction along its major axis V such as along a typical roadway environment generally designated by the numeral 10. Lane boundaries are shown by lines 20,21 and an extended roadside object 13 is illustrated to represent such common roadway environmental elements as guardrails, fences, infrastructure abutments, etc.

Vehicle 12 is equipped with a blind-zone radar system 15 operative to transmit radio signals and receive said radio signals when reflected back thereto. The transmitted radio signals have a radiation pattern 14 substantially corresponding to the main lobe thereof. Radiation pattern 14 has a spread angle $\theta$ which also substantially corresponds to the reception pattern spread angle. The radiation and reception patterns correspond to what is termed as vehicle blind-zone for detecting the presence of hazard objects therein which may otherwise remain visually undetected due to obstructions or limited mirror viewing fields.

Figure 2:
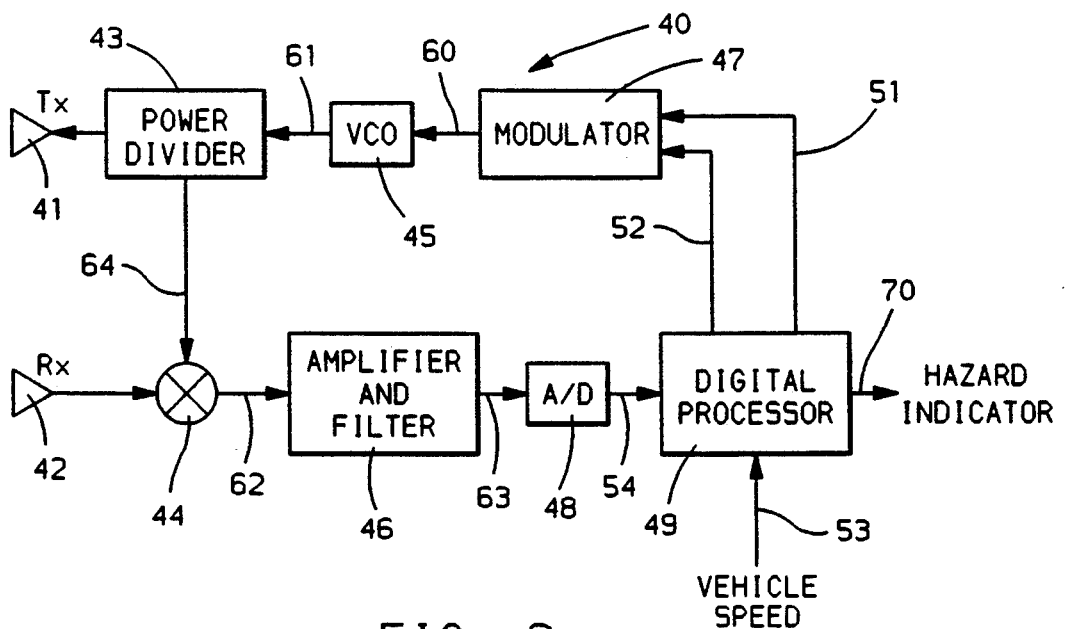
FIG. 2 shows a block diagram of an exemplary vehicular radar system in accordance with the present invention.

An exemplary blind-zone radar system as illustrated in context to a vehicle as numeral 15 in FIG. 1, is designated generally as numeral 40 in FIG. 2 and has a transmit antennae 41 for establishing the radio signal radiation pattern 14. Receiving antennae 41 is configured to receive reflected radio signals within substantially the same pattern established by transmitting antennae 41. Modulator 47 is a multi-function modulator responsive to digital control lines 51 and 52 to produce an analog voltage output on line 60 for control of voltage controlled oscillator (VCO) 45. Modulator 47 responds, for example, to a high logic signal on line 52 by outputting a constant DC voltage on line 60 so that VCO 45 outputs a continuous wave (CW) radar signal on line 61. Modulator 47 responds to a low logic signal on line 52 by outputting a linear ramped voltage on line 60 so that VCO outputs a frequency modulated - continuous wave (FM-CW) radar signal on line 61. The direction of the linear ramped voltage on line 60 is dependent on the logic signal on line 51, thereby allowing both an upramped and a down-ramped voltage and correspondingly unique FM-CW radar signals.

The radar signal on line 61 reaches power divider 43 whereat a portion is routed to transmitting antennae 41 and another portion thereof is routed to mixer 44 via line 64. Mixer 44 also receives radar signals from receiving antennae 42 which are reflected portions of the transmitted radar signals from antennae 41. The two signals are heterodyned thereby producing an IF signal on line 62 at the output of mixer 44. The IF signal is amplified and filtered at 46 to remove low frequency and DC components thereof, and the output therefrom on line 63 is the frequency differential between the transmitted and received signals. The resultant signal is digitized to facilitate processing by digital processor 49. Digital processor 49 operates according to a predetermined control algorithm as set forth herein, for controlling modulator 47, processing conditioned radar signals to determine therefrom target range and apparent velocities thereof, and to further distinguish hazard from non-hazard events. Digital processor 49 comprises a CPU with internal clock, ROM, RAM and various digital input and output ports. In addition to control lines 51 and 52, digital output line 70 provides an indication via its logic state the presence or absence of a hazard target. Input line 53 comprises a measure of vehicle speed, a quantity desirable for adapting the radar system to varying vehicle speeds.

Figure 3A:
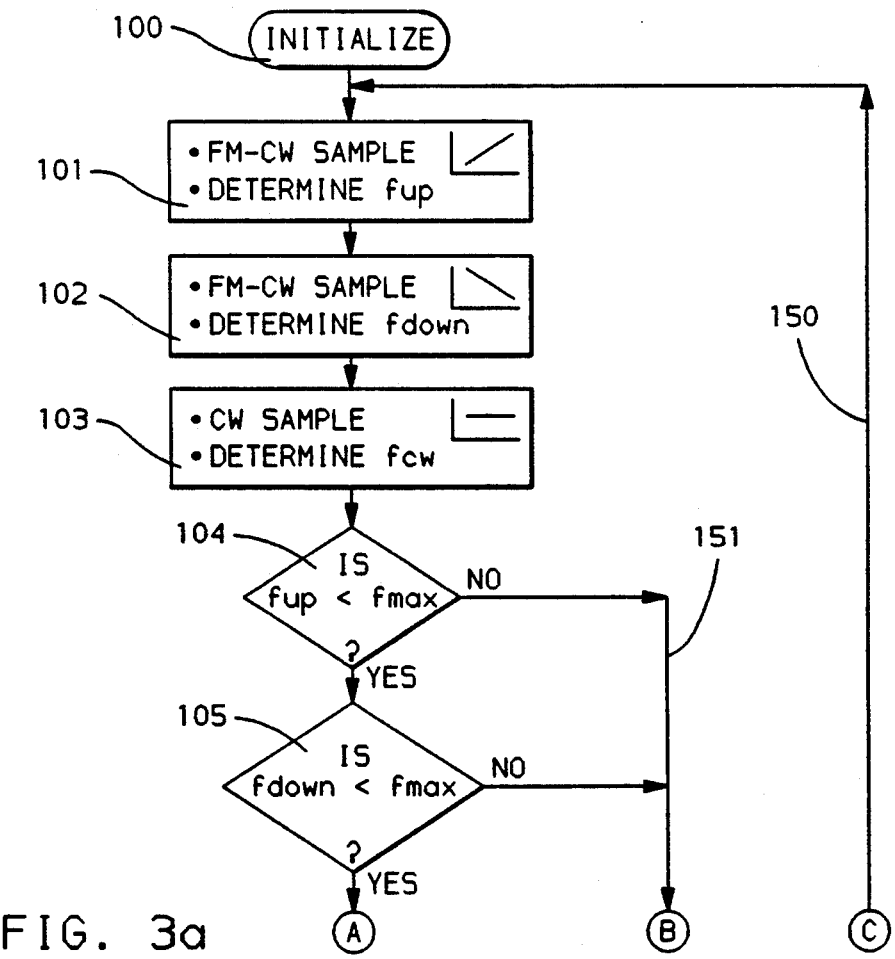
FIGS. 3a and 3b are flow diagrams representative of program instructions executed by the digital processor as shown in FIG. 1 for carrying out the target discrimination functions of the present invention.
Figure 3B:
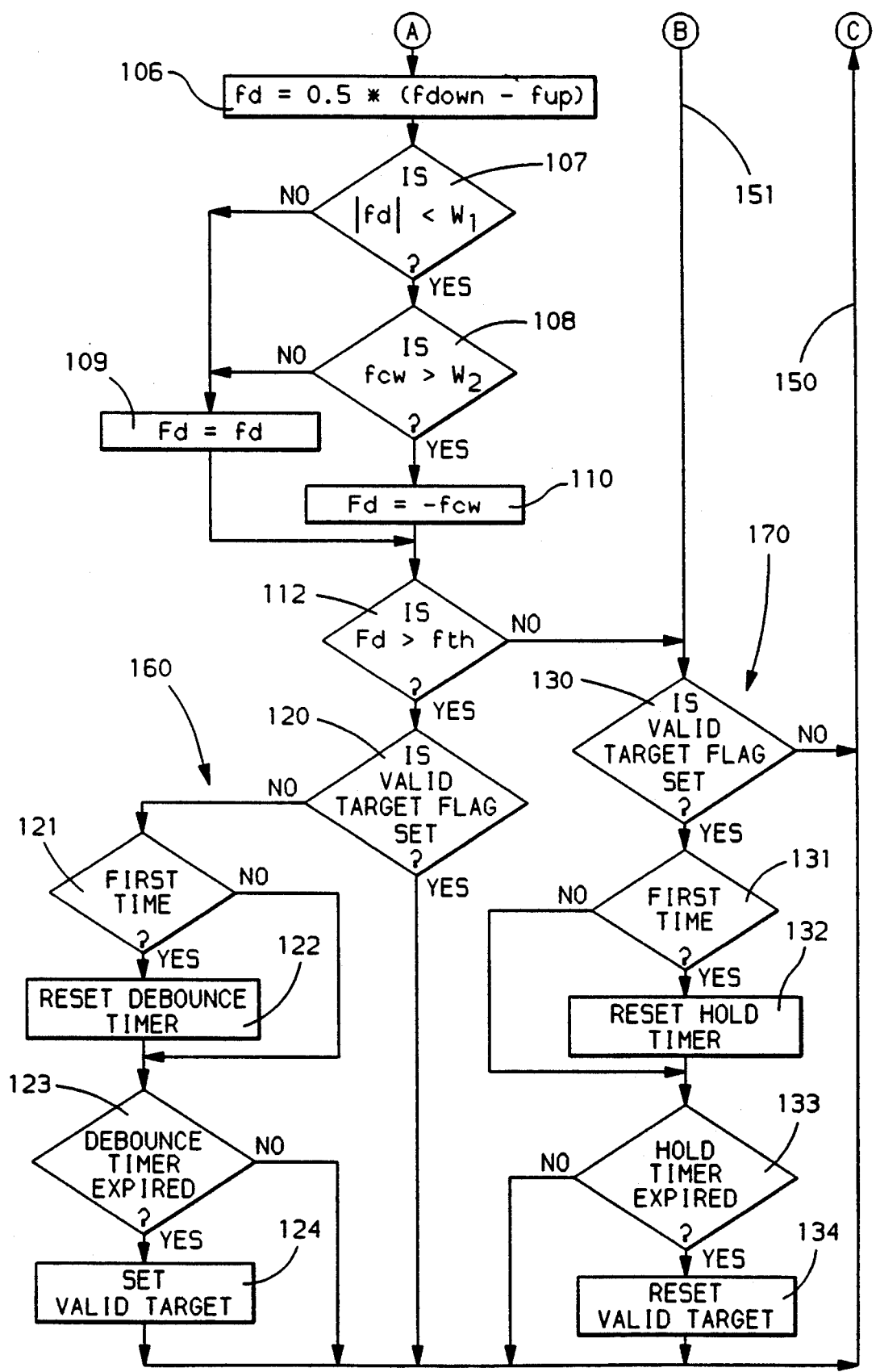

The flow diagrams of FIGS. 3a and 3b represent program instructions to be executed by digital processor 49 to accomplish the hazard and non-hazard target discrimination in accordance with this invention. The flow diagrams of FIGS. 3a-3b represent the functions performed by those steps which are pertinent to the present invention.

Beginning with FIG. 3a, the reference numeral 100 designates a set of program instructions executed at the initiation of each period of radar system usage for initializing the various tables, timers, flags etc. used in carrying out the functions of the present invention. Following such initialization, a group of target discrimination steps comprising blocks 101-112 and alternative groups of target acceptance steps 160 comprising blocks 120-124 or target rejection steps comprising blocks 130-134 are repeatedly executed as designated by the flow lines connecting the blocks and return line 150.

Instruction blocks 101-103 perform radar signal transmission, reception and signal processing functions to establish well known radar data quantities. Instruction block 101 performs a first FM-CW radar cycle including controlling modulator 47 via control lines 51 and 52 to produce transmission of an up-sweep signal according to a linear ramp in the present embodiment, reading in an amplified, filtered and digitized IF signal at input line 54 and calculating therefrom the lowest order spectral component $f_{up}$ such as by well known Fast Fourier Transform (FFT) techniques. The quantity $f_{up}$ is a rough measure of range to the target reflecting the transmitted signal. Instruction block 102 next performs a second FM-CW radar cycle but with a downsweep signal according to a linear ramp and similarly calculates the lowest order spectral component $f_{down}$. Instruction block 103 next performs a CW radar cycle and determines the CW doppler quantity $f_{cw}$. The CW doppler quantity $f_{cw}$ is a pure doppler frequency difference without algebraic sign and thus a measure of apparent target velocity magnitude but not direction. Instruction blocks 101-103 provide a portion of the necessary data to carry out the method of the present invention, those being the quantities $f_{up}$, $f_{down}$ and $f_{cw}$ in the present embodiment. It is here noted that the time intervals for the up-sweep and down-sweep FM-CW cycles be substantially equivalent in order that any doppler frequency component present in the measured quantities $f_{up}$ and $f_{down}$ can be extracted therefrom in subsequent processing steps as later described. Other modulating waveforms such as rising and falling portions of a sinusoidal signal could be used in place of the chosen linear ramps. However, linear ramp modulation is preferred since it provides for relatively simple discrimination as between multiple targets in comparison to non-linear modulation such as sinusoidal waveforms would provide. Alternative methods and techniques for obtaining the FM-CW and CW quantities heretofore referenced will be apparent to one having ordinary skill in the art.

Decision blocks 104 and 105 determine whether the target is within a predetermined range. The quantities $f_{up}$ and $f_{down}$ may contain a doppler frequency component depending upon the relative motion between the vehicle and target and thus each may differ from the other; however, they provide a sufficient estimate of range for the intended purpose of preliminarily detecting targets. Decision block 104 compares $f_{up}$ to a predetermined quantity $f_{max}$ representing a maximum range of concern. If the quantity $f_{up}$ is less than $f_{max}$, then the rough measure of target range represented thereby is determined to be within the range of concern and decision block 105 is next executed. The quantity $f_{down}$ is similarly compared to $f_{max}$ at decision block 105 and if it is also less than $f_{max}$ then the target is accepted as being within the range of concern and instruction block 106 is next executed. If either $f_{up}$ or $f_{down}$ is greater than $f_{max}$, then the current target detection is immediately considered a non-hazard event, no further target discrimination steps need be performed and processing proceeds to target rejection steps 170 via line 151. Alternatively, the range may be determined by comparing the average of quantities $f_{up}$ and $f_{down}$ with $f_{max}$, which technique effectively eliminates any doppler frequency component as between the two quantities averaged.

Proceeding with the assumption that the target is preliminarily determined to be within the range of concern, instruction block 106 extracts the FM-CW doppler quantity $f_d$ from the FM-CW quantities $f_{up}$ and $f_{down}$ by calculating one half the difference therebetween. The FM-CW doppler quantity $f_d$ is a measure of the apparent target velocity. The FM-CW doppler quantity $f_d$ may be positive or negative, a positive value thereof being indicative of a closing target and a negative value thereof being indicative of a receding target. The first prong of a two prong discrimination test is performed at decision block 107. The magnitude of $f_d$ is compared to a predetermined quantity $W_1$ representing a minimum apparent target velocity magnitude which will reliably indicate whether the target is a potential hazard. Where the magnitude of $f_d$ is equal to or greater than $W_1$, the current target detection is considered a potential hazard event and instruction block 109 sets the retained doppler quantity $F_d$ used in further processing to the FM-CW doppler quantity $f_d$. In the case of a roadside target, for example a guard rail, the strongest reflected radar signals are perpendicular the guard rail and thus the FM-CW doppler quantity $f_d$ is a measure of the apparent velocity of the guard rail section adjacent the vehicle. Where the vehicle is closing in on the guard rail, the apparent velocity therebetween may cause a negative response to decision block 107, immediately indicating a potential hazard event. Alternatively, where the vehicle travel is substantially parallel with the guardrail, the apparent velocity and thus the magnitude of FM-CW doppler quantity $f_d$ is correspondingly small and decision block 107 will be affirmatively answered.

Assuming decision block 107 is answered affirmatively, decision block 108 is next executed comparing the CW doppler quantity $f_{cw}$ to a predetermined quantity $W_2$ representing a minimum target velocity magnitude which will reliably indicate whether a significant difference between the FM-CW doppler quantity $f_d$ and the CW doppler quantity $f_{cw}$ is detected. In the case where the magnitude of the FM-CW doppler quantity $f_d$ is small (indicating little or no apparent relative motion between the vehicle and target) and the CW doppler quantity $f_{cw}$ is also small (likewise indicating little or no apparent relative motion between the vehicle and target), the current target detection is considered a potential hazard event and instruction block 109 sets the retained doppler quantity $F_d$ used in further processing to the FM-CW doppler quantity $f_d$. In the case where the magnitude of the FM-CW doppler quantity $f_d$ is small (indicating no apparent relative motion between the vehicle and target) and the CW doppler quantity $f_{cw}$ is large (indicating apparent relative motion between the vehicle and target), the current target detection is considered a non-hazard event and instruction block 110 sets the retained doppler quantity $F_d$ used in further processing to the algebraic negative value of the CW cycle doppler quantity $f_{cw}$ in order to readily flag the current target detection as a non-hazard target event. The divergent FM-CW and CW doppler quantities are explained and resolved as follows with reference back to FIG. 2 where necessary.

As was previously discussed relative a roadside target such as a guard rail, the strongest reflected radar signals are perpendicular thereto. The IF signals produced during the FM-CW and CW cycles will, when processed through amplifier and filter 46, produce respective frequency signals on line 63 which are the differences in frequency between the two heterodyned signals for the particular cycle. In the case of an FM-CW cycle with a roadside target, the perpendicularly reflected signal will, when heterodyned with the transmitted signal, produce an IF signal on line 62 which has a high frequency content so as to pass through the filter at 46 thus producing the dominant lowest order spectral component on line 63. Therefore, the FM-CW doppler quantity $f_d$ will be small or non-existent thus indicating minimal relative motion between the vehicle and the target. However, in the case of a CW cycle with the same roadside target, the perpendicularly reflected signal will, when heterodyned with the transmitted signal, produce an IF signal on line 62 which has minimal if any high frequency content due to the near zero frequency differential (zero doppler component) therebetween the transmitted and perpendicularly reflected signal so as to be greatly attenuated through the filter at 46 thus producing little if any high frequency spectral component on line 63. The dominant lowest order spectral component on line 63 during a CW cycle is therefore the result of the doppler content of the heterodyned reflected and transmitted CW signals. Non-perpendicular portions of the roadside target will have a relative velocity with the vehicle and thus the signal reflected thereby will heterodyne with the transmitted signal to produce an IF signal having substantial high frequency content which will pass through the filter at 46 to produce the dominant lowest order spectral component on line 63. Therefore, the CW doppler quantity $f_{cw}$ will be large thus indicating relative motion between the vehicle and the target. Where decision block 107 is answered in the affirmative and decision block 108 is answered in the affirmative, divergent FM-CW and CW doppler quantities indicate a roadside target which is not a hazard in its present relationship to the vehicle. As previously mentioned, instruction block 110 is then executed when passed to from decision block 108 where the retained doppler quantity $F_d$ used in further processing is set to the algebraic negative value of the CW cycle doppler quantity $f_{cw}$ in order to readily flag the current target detection as a non-hazard event.

After the retained doppler quantity $F_d$ is set at instruction block 109 or 110, the two paths therefrom merge and next execute decision block 112. The retained doppler quantity $F_d$ is compared to a threshold value $f_{th}$ representative of a closing velocity which, if exceeded, determines that the current target detection is a hazard event. The threshold value $f_{th}$ is a predetermined positive value which is, in the present embodiment, a function of vehicle speed and is preferably read from a conventional two dimensional look-up table or alternatively by formula computation. Additionally, other parameters such as tire to roadway friction coefficients and weather conditions may be included in determining the threshold value. The threshold value $f_{th}$ cannot be exceeded in the case where the retained doppler quantity $F_d$ was set negative at instruction block 110, and decision block 112 will therefore pass processing on to a group of target rejection steps 170. This follows since the current target detection was already considered a non-hazard event. The threshold value $f_{th}$ may or may not be exceeded in the case where the retained doppler quantity $F_d$ was set at instruction block 109 thereby indicating a potential hazard event. A receding target will have a negative value for the retained doppler quantity $F_d$ and cannot exceed the threshold value $f_{th}$ which is positive. A closing target on the other hand will have a positive value for the retained doppler quantity $F_d$ and depending upon its magnitude may exceed the threshold value $f_{th}$. If the threshold value $f_{th}$ is exceeded, then the potential hazard event is considered a hazard event and a group of target acceptance steps 160 is next executed. Conversely, if the threshold value $f_{th}$ is not exceeded, then the potential hazard event is considered a non-hazard event and a group of target rejection steps 170 is next executed.

Proceeding with the assumption that the threshold value $f_{th}$ is exceeded, the group of target acceptance steps 160 is executed to determine if the valid target flag will be set. A set valid target flag in the present embodiment indicates that a predetermined number of consecutive hazard events has been detected. Decision block 120 is first encountered and determines if a valid target flag is currently set. If the valid target flag is set, the current hazard event is merely cumulative, the valid target flag remains set and decision block 120 returns processing via line 150 to instruction block 101 to begin execution of another group of target discrimination steps. If the valid target flag is not set, processing passes to decision block 121 which checks if this current pass through target acceptance steps 160 is the initial pass since the last non-hazard event was detected. If this pass is the first time through, then a debounce timer is reset at instruction block 122 and begins a countdown. If this is not the first pass, the debounce timer is not reset; rather, it continues to countdown. Decision block 123 next determines if the debounce timer has expired. An expired debounce timer indicates that a sufficient number of consecutive hazard events has occurred to accept the current target as a hazard. Therefore, if the debounce time has expired, instruction block 124 sets the valid target flag which remains set so long as the group of target rejection steps 170 does not reset it.

Proceeding with the assumption that the threshold value $f_{th}$ is not exceeded or the target is out of range, the group of target rejection steps 170 is executed to determine if the valid target flag will be reset. A reset valid target flag in the present embodiment indicates that a predetermined number of consecutive non-hazard events has been detected. Decision block 130 is first encountered and determines if a valid target flag is currently set. If the valid target flag is not set, the current non-hazard event is merely cumulative, the valid target flag remains reset and decision block 130 returns processing via line 150 to instruction block 101 to begin execution of another group of target discrimination steps. If the valid target flag is set, processing passes to decision block 131 which checks if this current pass through target rejection steps 170 is the initial pass since the last hazard event was detected. If this pass is the first time through, then a hold timer is reset at instruction block 132 and begins a countdown. If this is not the first pass, the hold timer is not reset; rather it continues to countdown. Decision block 133 next determines if the hold timer has expired. An expired hold timer indicates that a sufficient number of consecutive non-hazard events has occurred to accept the current target as a non-hazard. Therefore, if the hold timer has expired, instruction block 134 resets the valid target flag which remains reset so long as the group of target acceptance steps 160 does not set it.

Of course the precise routine of accepting and rejecting groups of sequential hazard and non-hazard events disclosed above is unnecessary to the actual discrimination as between hazard and non-hazard events which preceded it, and is only described to illustrate the preferred embodiment. While the invention has been described in reference to the illustrated embodiment, it is expected that various modifications will occur to those skilled in the art, and it should be understood that methods incorporating such modifications may fall within the scope of this invention in which is defined by the appended claims.

The embodiments of the invention in which an exclusive property or privilege is claimed are defined as follows:

1. A road vehicle radar system for discriminating between hazard and non-hazard targets within a predetermined zone, the system comprising in combination:
    means for transmitting a pair of FM-CW radar signals;
    means for transmitting a CW radar signal;
    means for receiving the transmitted FM-CW and CW radar signals reflected from the target;
    means for determining a first apparent relative velocity of the target from the received FM-CW radar signals;
    means for determining a second apparent relative velocity of the target from the received CW radar signal; and
    means for comparing the first and second apparent relative velocities in magnitude to thereby determine from the difference therebetween whether the target is a hazard.

2. A road vehicle radar system for discriminating between hazard and non-hazard targets within a predetermined zone, the system comprising in combination:
    transmitting means for means for transmitting a pair of FM-CW radar signals and a CW radar signal;
    receiving means for receiving said transmitted FM-CW and CW radar signals reflected from a current target;
    means for determining a FM-CW doppler quantity from the received FM-CW radar signals and a CW doppler quantity from the received CW radar signal; and
    means for identifying contradictory FM-CW and CW doppler quantities to thereby establish the current target as a non-hazard.

3. A road vehicle radar system according to claim 2 wherein said FM-CW radar signals are linearly modulated.

4. In a road vehicle radar system, a method for discriminating between hazard and non-hazard targets within a predetermined zone, comprising the steps of:
    transmitting a pair of FM-CW radar signals and a CW radar signal;
    receiving said transmitted FM-CW and CW radar signals reflected from a current target;
    determining a FM-CW doppler quantity from the received FM-CW radar signals and a CW doppler quantity from the received CW radar signal; and
    identifying contradictory FM-CW and CW doppler quantities to thereby establish the current target as a non-hazard.

* * * * *